(12) United States Patent
Park

(10) Patent No.: US 7,134,814 B1
(45) Date of Patent: Nov. 14, 2006

(54) ADJUSTABLE POCKET DRILLING FIXTURE

(76) Inventor: Joon Park, 1320 Virginia Ave., Glendale, CA (US) 91202

( * ) Notice: Subject to any disclaimer, the term of this patent is extended or adjusted under 35 U.S.C. 154(b) by 360 days.

(21) Appl. No.: 10/668,659

(22) Filed: Sep. 23, 2003

Related U.S. Application Data

(63) Continuation-in-part of application No. 10/001,774, filed on Nov. 15, 2001, now Pat. No. 6,637,988.

(51) Int. Cl.
*B23B 47/28* (2006.01)

(52) U.S. Cl. .................................. 408/103; 408/115 R

(58) Field of Classification Search ............... 408/728, 408/97, 103, 115 R, 115 B, 241 B
See application file for complete search history.

(56) References Cited

U.S. PATENT DOCUMENTS

| | | | |
|---|---|---|---|
| 1,128,970 A | 2/1915 | Godefroy et al. | |
| 1,401,262 A | 12/1921 | Kranz | |
| 1,890,664 A * | 12/1932 | Alden | ..................... 408/241 R |
| 1,919,900 A | 7/1933 | Moller | |
| 2,268,930 A * | 1/1942 | Edwards | ..................... 408/103 |
| 2,490,718 A * | 12/1949 | Stellin | ..................... 408/241 R |
| 2,519,468 A | 8/1950 | Hengst | |
| 2,843,167 A * | 7/1958 | Rushton | ....................... 144/76 |
| 3,263,531 A * | 8/1966 | Sammons et al. | ............ 408/97 |
| 3,306,137 A * | 2/1967 | Mele | ....................... 408/241 R |
| 4,594,032 A * | 6/1986 | Warburg | .................. 408/115 R |
| 4,904,130 A * | 2/1990 | Gorman | ....................... 408/16 |
| 4,955,766 A | 9/1990 | Sommerfeld | |
| 5,076,742 A * | 12/1991 | Lee et al. | .................... 408/112 |
| 5,676,500 A | 10/1997 | Sommerfeld | |
| 5,791,835 A | 8/1998 | Chiang et al. | |
| 6,254,320 B1 | 7/2001 | Weinstein et al. | |
| 6,394,712 B1 | 5/2002 | Weinstein et al. | |
| 6,481,937 B1 | 11/2002 | Sommerfeld et al. | |
| 6,637,988 B1 * | 10/2003 | Park | .......................... 408/103 |
| 2001/0036389 A1 | 11/2001 | Park | |

* cited by examiner

*Primary Examiner*—Daniel W. Howell
(74) *Attorney, Agent, or Firm*—Christie, Parker & Hale, LLP

(57) ABSTRACT

A pocket drilling fixture has a clamp base with a clamping face formed thereon. Opposing the clamp base is a clamp body with an opposing clamping face. Clamp structure interengages the clamp body and the base. The clamp structure includes a clamp actuator positioned adjacent to the base to move the clamp body in a clamping direction. A guide carrier has at least one drill guide disposed therein, and has an axis which intersects a plane defined by the clamping face. The guide carrier is mounted on the base to move in the direction parallel to the plane. The base may have formed thereon a turret having multiple surfaces for height adjustment. The turret may be positioned under the guide carrier to set its height above the base so that height can be preselected, depending on the workpiece thickness.

12 Claims, 4 Drawing Sheets

ADJUSTABLE POCKET DRILLING FIXTURE

CROSS-REFERENCE TO RELATED APPLICATIONS

This application is a continuation-in-part (CIP) of U.S. patent application Ser. No. 10/001,774 entitled "Adjustable Pocket Drilling Fixture" filed Nov. 15, 2001 now U.S. Pat. No. 6,637,988, the contents of which are fully incorporated by reference herein.

FIELD OF THE INVENTION

This invention is directed to a fixture which permits pocket drilling in wood workpieces in various setups.

BACKGROUND OF THE INVENTION

Two wood workpieces are sometimes fastened together by means of a pocket joint. A pocket joint is a pocket hole in the first piece, with a screw in the pocket hole extending into the second workpiece. A pocket hole is one that is made at an angle in a first piece of wood, entering from the side and exiting out of the edge. Usually, the pocket is sufficiently large to fully contain the head of the screw so that, when the screw is recessed in the hole, it is not exposed.

SUMMARY OF THE INVENTION

In order to aid in the understanding of this invention, it can be stated in essentially summary form that it is directed to a pocket drilling hole fixture that has a base. The base carries a first clamp face. Movably mounted with respect to the base is a clamp jaw with a second clamp face. The actuator to draw the clamp jaw toward the first clamp face on the base is mounted on the base. Also mounted on the base is a drill guide carrier. The drill guide carrier has a drill guide hole. The drill guide carrier is adjustably mounted with respect to the base so that it can be moved to selected positions with respect to the base.

It is thus a purpose and advantage of this invention to provide a movably adjustable pocket drilling fixture which has both the clamp actuator and the pocket drilling guide hole on the same side of the fixture so that the user can apply the adjustable pocket drilling fixture to a workpiece and both clamp and drill from the same side of the workpiece.

It is another purpose and advantage of this invention to provide a movably adjustable pocket drilling fixture that can be quickly and easily applied to the edge of a workpiece for the accurate drilling of a pocket hole.

It is another purpose and advantage of this invention to provide a movably adjustable pocket drilling fixture wherein the position of the drill guide carrier can be selectively positioned with respect to the base of the pocket drilling fixture so as to permit the pocket hole to be drilled at different selected heights, but at the same angle so as to enable selection of the position at the bottom edge of the workpiece in which the pocket hole will exit.

It is another purpose and advantage of this invention to provide a movably adjustable drill guide carrier so that the position in which the angular pocket hole is drilled in the side of the workpiece can be selected from any positions so as to select a position at which the hole is drilled for different thickness of the workpiece.

It is another purpose and advantage of this invention to provide a quick movement of the drill guide carrier from and on the carrier support horizontally/laterally so as to drill at least two pocket holes at different locations without exiting/entering the drill bit and unclamping/clamping the workpiece.

Other purposes and advantages of this invention will become apparent from a study of the following portion of the specification, the claims and the attached drawings.

DETAILED DESCRIPTION

Figure 1:
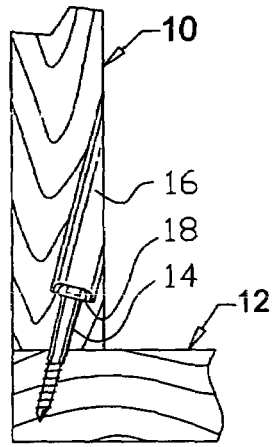
FIG. 1 is a section through first and second wood workpieces wherein the workpieces are joined by a wood screw in a pocket hole in the first workpiece and showing the height of the pocket hole on the side of the first workpiece that is of nominal ¾ inch thickness.

FIG. 1 shows a first workpiece 10 that is to be fastened to the second workpiece 12 in the present example. This fastening is to be accomplished by means of a wood screw 14 that is installed in pocket 16. The pocket 16 has a larger diameter where it enters into the sidewall of the first workpiece 10. The larger diameter is sufficient to receive the head 18 of the wood screw 14.

Figure 2:
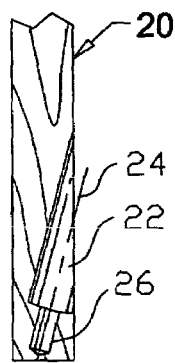
FIG. 2 is a section through a first workpiece at the point at which a pocket hole is drilled, showing the lower entry of the pocket hole for a first workpiece of lesser nominal thickness; for example, ½ inch.

The pocket hole 16 also has an axially aligned smaller hole that receives the shank of the wood screw. When the wood screw is installed in the pocket, it exits out of the bottom edge of the first workpiece 10 and is screwed into the second workpiece 12. It is conventional to drill such pockets at 15 degrees with respect to the side surface of the first workpiece 10. As an illustration, the thickness of the workpiece 10 in the transverse direction of the sheet is ¾ inch. The criteria for drilling a pocket hole include the following requirements. The pocket hole 16 that accepts the head of the wood screw should be fully into the workpiece so that the screw head does not extend beyond the surface of the workpiece. In addition, the pocket hole must be sufficiently high so that the screw head has enough material to engage to provide a firm joint. Furthermore, the pilot drill hole 26 must be fully in the workpiece so that the screw shank is not exposed. When the workpiece is not as thick (for example, ½ inch in thickness), the center line of the drilled pocket hole must come out further to the other side of workpiece 20 than the face of the wood into which the pocket hole 22 is drilled. To accomplish this, the entry of the drilled pocket hole is closer to the lower end of the workpiece. This is illustrated in FIG. 2 where the workpiece 20 is shown as being ½ inch thick. Pocket hole 22 is illustrated as being started high enough on the workpiece so that the axis 24 of the pocket drill bit exits the lower edge of the workpiece and the pocket hole can fully receive the head of the screw. In FIG. 2, the pilot drill hole 26 is also seen. Thus, with the drill axis fixed at 15 degrees, the entry height is suitably adjusted to accomplish the goals of fully receiving the head while exiting out of the lower edge of the workpiece.

Figure 3:
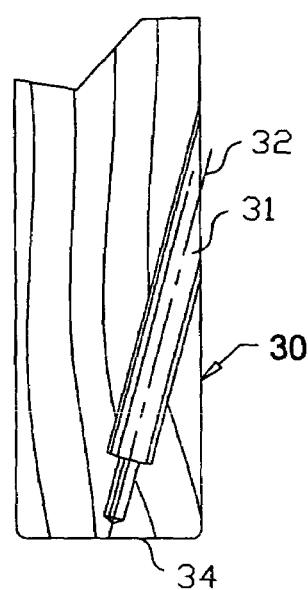
FIG. 3 is similar to FIG. 2, but showing the position of entry of the pocket hole in a first workpiece having a nominal 1-½ inch thickness.

In FIG. 3, the workpiece 30 is scaled to be 1-½ inches thick. The pocket 32 is started high enough on the side of the workpiece so that the drill axis 32 intersects the bottom edge surface 34 substantially at its mid-point, similarly to that shown in FIG. 2. By this adjustment, a suitably designed pocket drilling fixture can be positioned so that the pocket drill axis intersects the bottom surface, the drill pocket fully accepts the screw head and there is sufficient material below the drill pocket so that the screw can strongly attach the workpiece with the drill pocket therein. These requirements must also be balanced with the height of the entry point of the pocket drill hole and the side of the workpiece.

Figure 4:
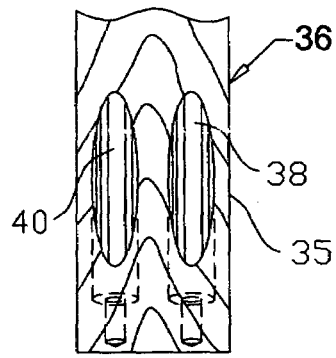
FIG. 4 is a front view of a first workpiece showing two pocket holes drilled adjacent each other.

On some occasions, it is desirable to drill a plurality of pocket holes for fastening with a plurality of screws. The workpiece 36 shown in FIG. 4 is seen from the side into which first and second pocket holes 38 and 40 are drilled parallel to each other. The distance between the plurality of pocket holes can vary depending upon the width of the workpiece into which they are drilled.

Figure 5:
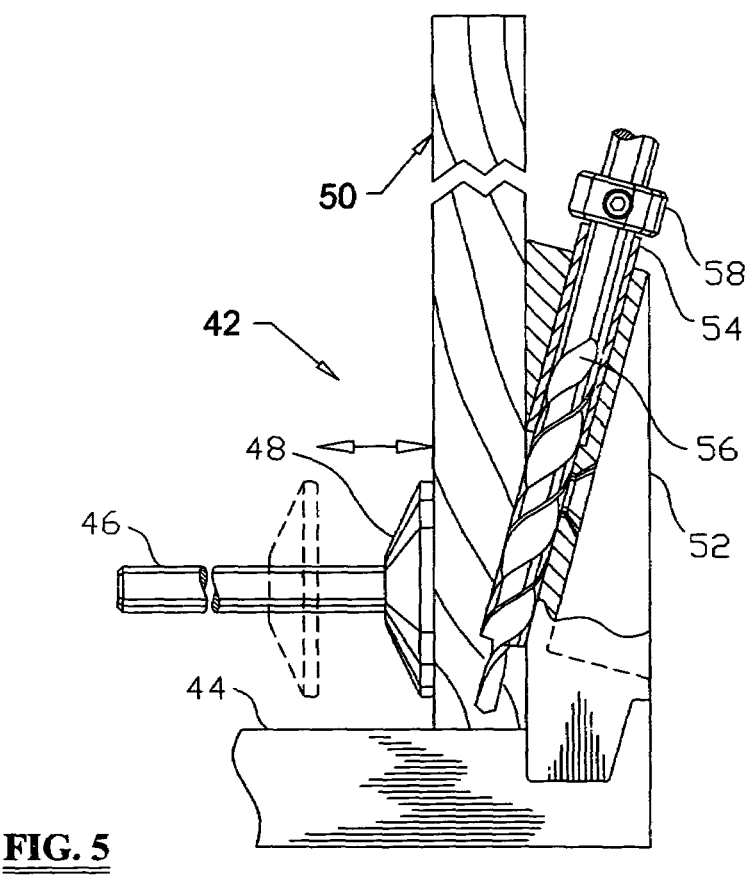
FIG. 5 is a side-elevational view of one example of the prior art, with parts broken away substantially on a section line through the axis of the drill guide.

FIG. 5 shows a prior art pocket drilling fixture 42 which has a clamp portion 44 on which is mounted a piston 46 which carries a foot 48 which engages against the workpiece 50. The piston has a mounting bracket and a lever to press the workpiece to the right. Mounted on the clamp portion 44 is guide portion 52. The workpiece 50 is clamped against the guide portion 52. The guide portion includes a drill guide channel 54. A drill 56 is introduced through the drill guide channel to drill the pocket hole in the workpiece 50. A stop collar 58 stops the advance of the drill at a point determined by the positioning of the stop collar.

One of the problems of this prior art structure is that the clamping is on one side of the workpiece and the drilling is on the other. When the workpiece is large, the artisan must walk around the workpiece to perform the two different functions of clamping and drilling. This complicates the drilling of suitable pockets and leads to unnecessary waste of time.

Figure 6:
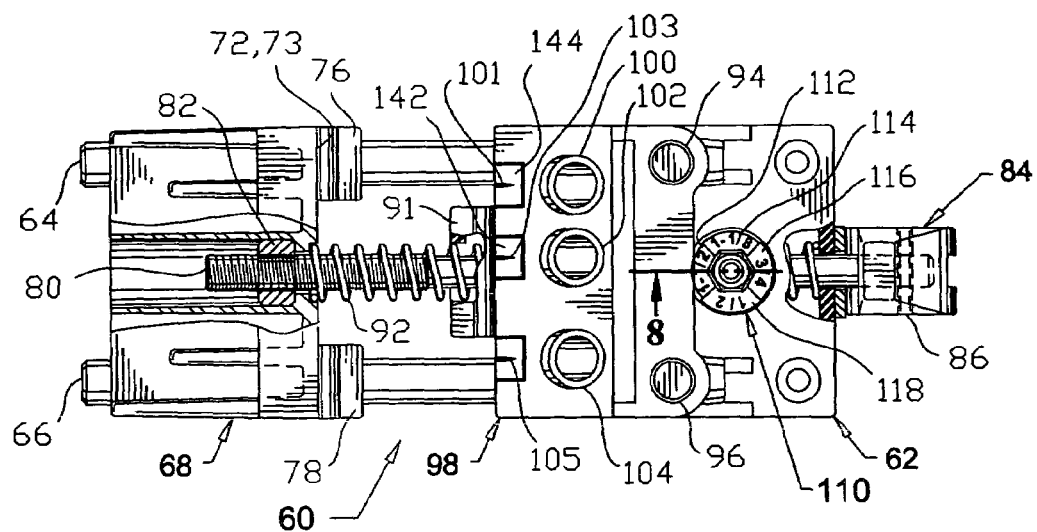
FIG. 6 is a plan view of the adjustable pocket drilling fixture of this invention.
Figure 7:
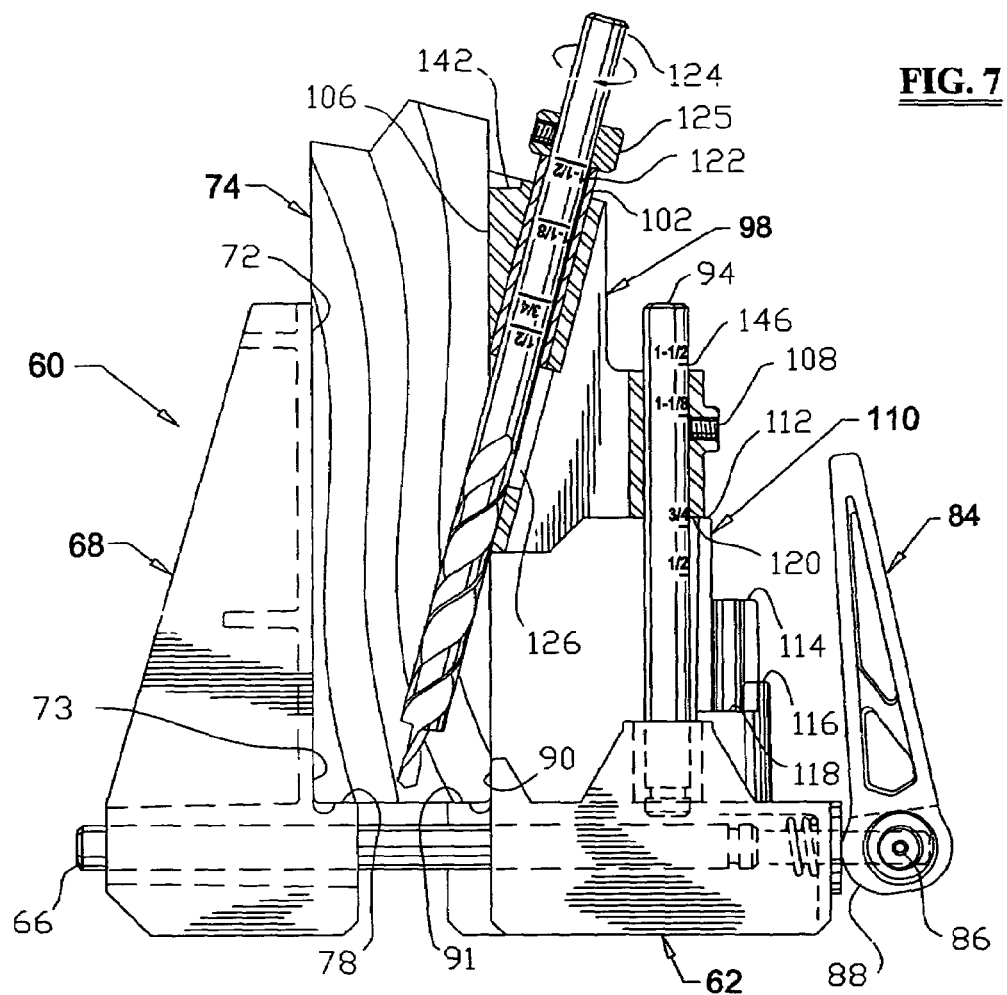
FIG. 7 is a side-elevational view thereof, with parts broken away substantially along the centerline of one of the drill guides.

An adjustable pocket drilling fixture 60 according to an exemplary embodiment of the present invention is shown in FIGS. 6 and 7. The fixture 60 has a base 62. Extending from the base are two guide bars 64 and 66. The guide bars are of uniform cross section and are illustrated as being cylindrical. In other embodiments, the guide bars may have other shapes and/or cross sections. The guide bars are secured in base 62 with their axes substantially parallel.

Clamp body 68 has two holes formed therethrough that closely fit the guide bars 64 and 66, and the clamp body slides on the guide bars substantially parallel to their axes. The clamp jaw is unitarily formed with the clamp body and extends upward from the guide bars. It has a clamping face 72 which can engage against the workpiece 74. The clamping face 72 is at substantially right angle with respect to the plane defined by the axes of guide bars 64 and 66. The clamp body 68 also has feet 76 and 78 formed thereon just above the openings for the guide bars. These feet act as stops against which the workpiece 74 engages.

The clamp body 68 is urged toward the base 62 by means of a clamp screw 80, which engages in a threaded nut 82 positioned in the clamp body 68 between the guide holes through the clamp body. The nut 82 and screw 80 preferably lie in the same plane as the guide bars 64 and 66. At the right end, the clamp arm 84 is pivoted on the screw 80 by means of cross pivot pin 86. The cam 88 of the clamp arm 84 has a larger radius toward the base 62 when the clamp arm 84 is in the raised position shown in FIG. 7. Thus, when the clamp arm is raised from the horizontal position to the raised position of FIG. 7, the screw 80 is pulled to the right. This moves clamp body 68 to the right.

Base 62 has a lower clamping face 90 formed thereon, against which the workpiece 74 is thrust when the clamp is engaged. Base 62 also has a foot 91 upon which the edge of the workpiece rests. Adjustment of the clamp to accommodate different thickness of workpiece can be accomplished by rotating the clamp arm 84 down to the horizontal position and rotating the handle and screw 80 until the correct adjustment is achieved. Compression spring 92 urges the clamp body 68 left to the disengaged position when the clamp arm 84 is released.

First and second upright guide bars 94 and 96 are mounted in base 62, and these bars are positioned at substantially right angle to the guide bars 64 and 66. Guide bars 94 and 96 are substantially parallel and of uniform cross section to serve as upright guides for guide carrier 98. The guide carrier 98 supports thereon three drill guide bushings 100, 102 and 104. The reference indicia 101, 103 and 105 are respectively placed in line with the axes of the drill guide bushings 100, 102 and 104, respectively. The placement of the drill guide bushings and indicia at different spacings permit the artisan to drill two pocket openings on the same setup and to choose between three different spacings between the two drill pocket holes.

As seen in FIG. 7, the drill guide bushings are at the usual angle of 15 degrees with respect to the vertical when the vertical is defined by the upright guide bars 94 and 96, and horizontal is defined by the guide bars 64 and 66. The guide carrier 98 has a clamping face 106 formed thereon which also engages against the workpiece 74 to hold it in place in the clamped position between the clamp faces. As seen in FIG. 7, guide carrier 98 has a chip opening 126 that permits the chips to clear during the drilling operation.

The guide carrier is movable up and down with upright guide bars 94 and 96. It can be secured at any selected position by tightening of the setscrew 108 seen in FIG. 7. Height can be established using a gauging structure, such as a turret 110 that is rotatably mounted on the base 62 over the clamp screw 80 and just to the right of guide carrier 98. The turret 110 has four different height sections with the first and highest having a top surface 112, a second height section having a height surface 114, a third height having a top surface 116, and the lowest step having a top surface 118.

The turret can be rotated so that any one of these surfaces can engage under the bottom surface 120 of the guide carrier 98.

While the guide carrier can be adjusted to any desired height on its upright guide bars 94 and 96, the turret provides a way to set the height for particular thickness of the workpiece. For example, the lowest step 118 on the turret is suitable for a workpiece that is ½ inch thick. This permits the proper positioning of the guide carrier to drill the pocket hole in a position, as described above. The height of surface 116 is suitable for a workpiece that is ¾ inch thick, and the height of the turret step 114 is suitable for a workpiece that is 1-⅛ inches thick. Similarly the height of the turret section 112 is suitable for a workpiece that is 1-½ inches thick. This presets the guide carrier height suitably to pocket-drill a workpiece of that thickness and come out at a suitable position at the edge of the workpiece. Thus, accurate setup height is quickly and easily achieved.

Figure 8:
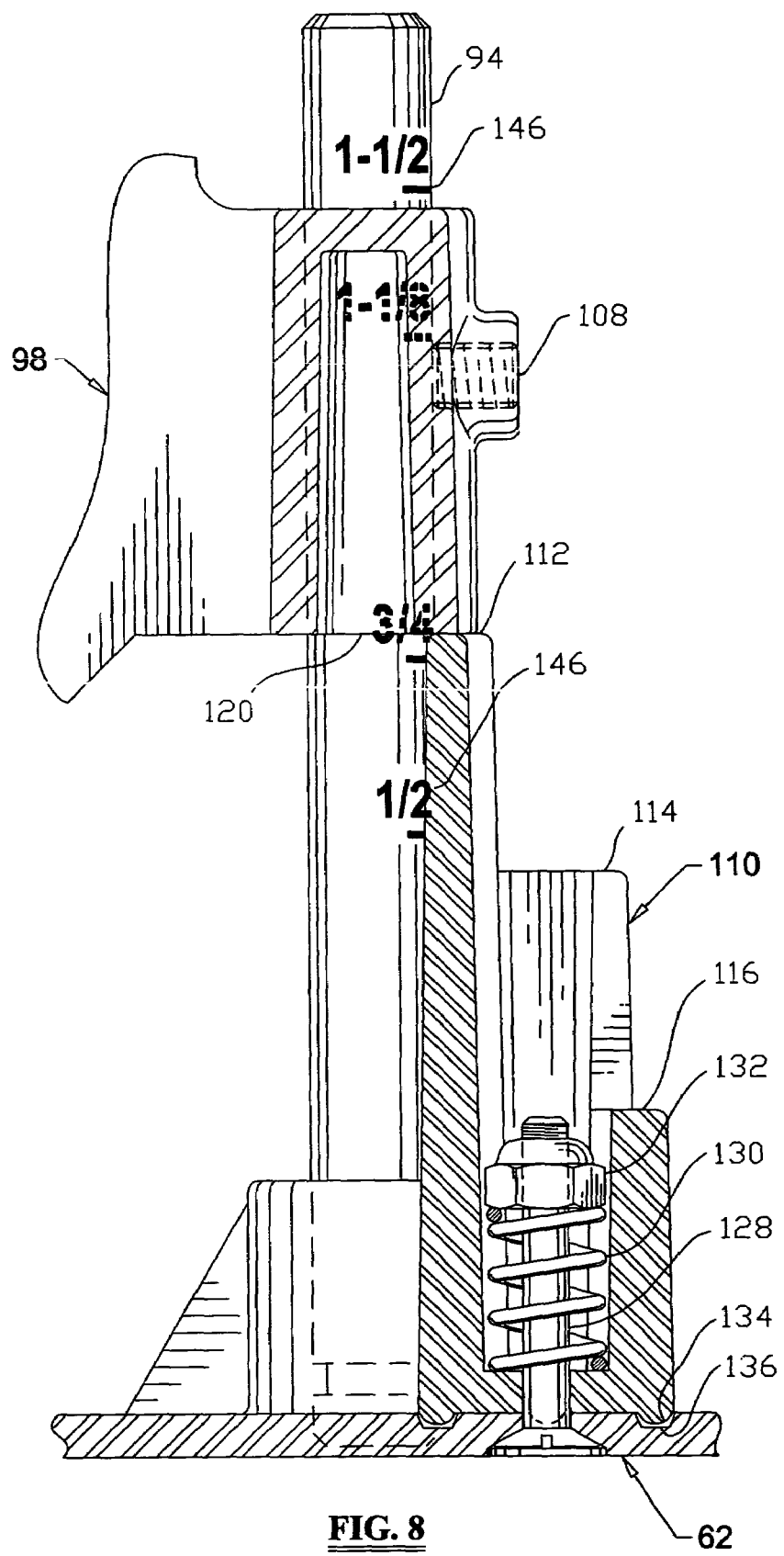
FIG. 8 is an enlarged section taken generally along the line 8—8 of FIG. 6, showing the turret that establishes the guide carrier height.

FIG. 8 shows the turret 110 rotatably mounted on the base 62. The turret rotates on shaft 128 and is held down onto the base by means of a compression spring 130, which is held in place by a nut 132. A detent mechanism comprises at least one bump 134 that extends into a recess 136. There are four such recesses 90 degrees apart, each corresponding to a position of a turret surface under the bottom surface 120 of the guide carrier 98.

When a workpiece 74 is to receive one or more pocket drill holes, the thickness of the workpiece is noted. Setscrew 108 is loosened, and guide carrier 98 is raised. Turret 110 is rotated until the corresponding turret height surface is under the stop surface 120 on the bottom of the guide carrier. Rotation of the turret is easy because the spring 130 holds the detent bump down into the detent recess so that the turret can be raised and rotated. When the selected turret height is under the bottom surface on the guide carrier 98, the guide carrier is lowered and the setscrew 108 is tightened for security. The workpiece 74 is put in place between the clamp faces 72 and 106 resting on the feet 76, 78 and 91. With the clamp arm 84 in the open, horizontal position, the arm is rotated on the axis of screw 80 until the clamp body 68 is almost clamped on the workpiece. Then the clamp arm is raised in the position shown in FIG. 7. This draws the screw 80 to the right by means of the cam action of cam surface 88 to clamp the workpiece 74 in place. In other embodiments, clamping means may include pneumatic actuator and wire cable that can be foot operated.

Next, the drill 124 is introduced into one or more of the drill guide bushings 100, 102 and/or 104. Whichever drill guide bushing is chosen is a function of the artisan's fastening needs. If two pocket drill holes are required, the artisan has a choice of three different spaces by choosing different pairs of the drill guide bushings. The rotating drill is introduced down through the drill guide bushings so that the workpiece is drilled. Chips are expelled from chip opening 126. Depth of drilling can be conveniently accomplished by observing the plural drill depth indicia 122 on the drill to control the depth of drilling as the pocket drilling is taking place.

If the artisan wants the pocket drill holes in particular places, he can scribe on the surface of the workpiece that lies against the guide carrier 98. He can then place the appropriate indicia 101, 103 or 105 at the scribe mark so that the pocket drill hole is properly positioned. These acts of positioning with respect to the guide marks, clamping and drilling are all accomplished at the same side of the workpiece 74. This is particularly important when the workpiece is large so that it is difficult to accomplish clamping and drilling functions if they are on opposite sides. When the pocket hole is drilled close to the end of the workpiece, it is important to know the relationship of the pocket hole to the workpiece. For this reason, in addition to the centerline marking indicia 101, the indicia pockets 142 and 144, seen in FIG. 6, show the position where the pocket holes will be drilled. The width of the indicia pocket is substantially equal to the pocket hole diameter, which is more useful than the centerline marking indicia 101. Further, FIG. 7 shows the indicia pockets as being recesses in the top surface of the guide carrier 98. With these indicia recesses visible, the artisan can make sure that the pocket hole will not intersect the end of the workpiece, but will be an adequate distance from it.

The depth of cutting is important because the pilot on the drill must reach or almost reach the bottom edge of the workpiece. The maximum amount of material between the shoulder on the drill and the bottom edge of the first workpiece is important for strength. It is also important that the pilot drill pocket be sufficiently deep so that it fully receives the head of the screw therein. Since the height of the drill guide carrier 98 is fixed by means of turret 110, the height of the drill guide bushing 104 is known. Thus, the depth of penetration can be regulated by marking suitable indicia 122 on the drill 124. A suitable indicia is provided for each of the set heights of the guide carrier 98 which correspond to the settings of the turret 110. This kind of drill depth control is easier to use because no individual stop setting for each depth is required. Furthermore, it is more accurate for the same reason.

Figure 9:
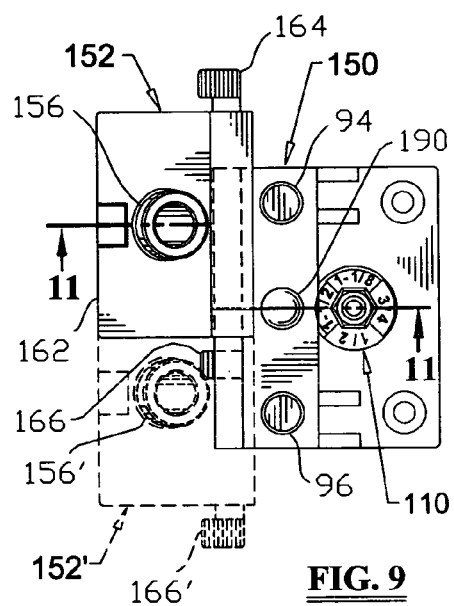
FIG. 9 is a partial plan view of an adjustable pocket drilling fixture according to another exemplary embodiment of the present invention, showing a slidable guide carrier mounted on a drill guide carrier support.
Figure 11:
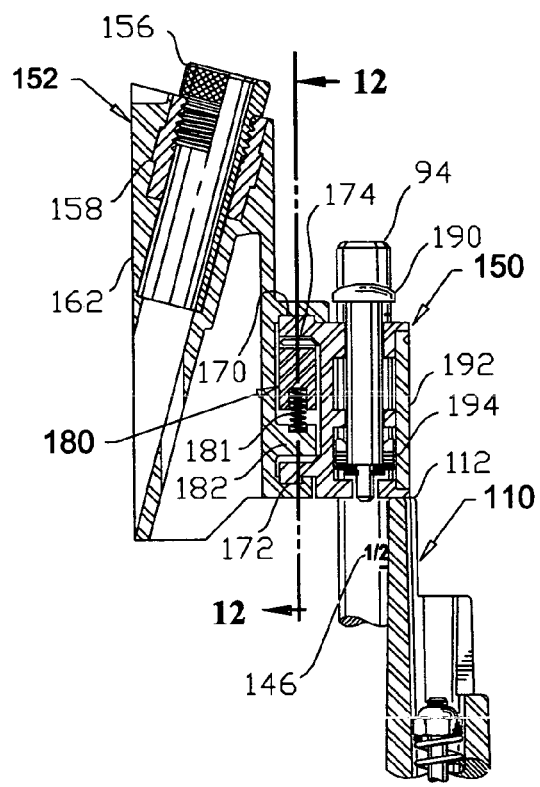
FIG. 11 is a sectional view taken generally along the line 11—11 of FIG. 9, showing the relationship between the guide carrier and the guide carrier support.
Figure 10:
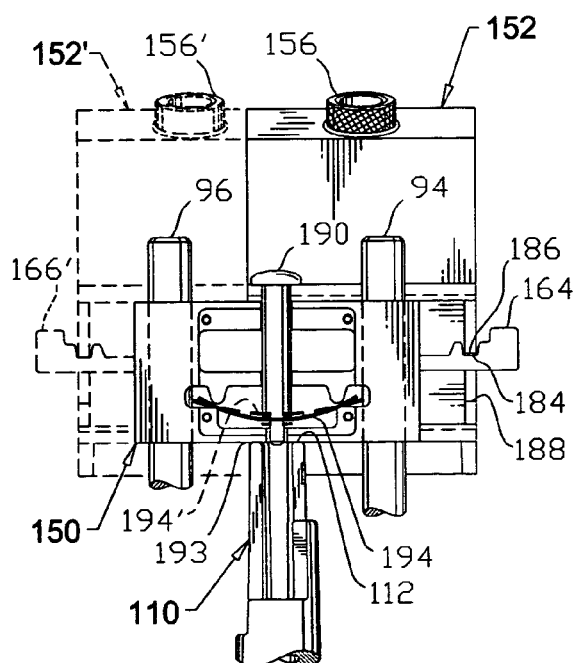
FIG. 10 is a rear view of the adjustable pocket drilling fixture of FIG. 9, showing snap height adjustment mechanism (for the drill guide carrier support).

FIG. 9 shows a drill guide carrier 152 that is slidable on a drill guide carrier support 150. The carrier support 150 is served by guide bars 94 and 96. The guide carrier 152 is slidable horizontally with respect to the carrier support 150 about upper and lower tongues 170 and 172 and grooves formed on the guide carrier 152 as shown in FIGS. 9–11. By pressing downward either a first or a second lever 164 or 166, pushing the guide carrier 152 to either direction and releasing the lever 164 or 166, the guide carrier 152 can be moved from a first position to a second position indicated by dotted lines 152' as shown in FIGS. 9 and 10.

Figure 12:
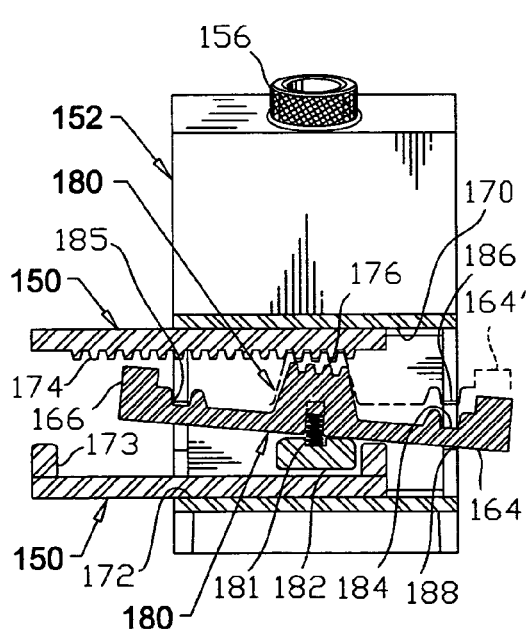
FIG. 12 is a sectional view taken generally along the line 12—12 of FIG. 11, showing the shuttle mechanism that enables the guide carrier to move from and on the guide carrier support.

An exemplary shuttle movement of the guide carrier is achieved using a positive detent mechanism as illustrated in FIG. 12. At the other end of the guide carrier 152, a detented teeth rack 174 is provided that can be engaged with a teeth detent 176 that is located at about the center of a lever assembly 180. A compression spring 181 and its support 182 are located between the upper and lower grooves on the opposite side of the clamping face 162, which pushes the teeth detent 176 and two side slots 184 to secure the lever assembly 180 into two side upper stops 186. The pressing down of the first lever 164 from initial position 164' forces to rotate the assembly 180 about an upper stop 185. This disengages the teeth portion 176 and the slot 184 from the teeth rack 174 and the upper stop 186 respectively. Further, movement of the guide carrier 152 with the lever down reaches to a position shown as dotted line position 152' and the guide carrier 152 will rest and maintain secure position by releasing the lever 164. The stroke adjustment from position of a drill guide bushing 156 to 156' can be adjusted by installation of setscrews in the extension 173 of the lower tongue 172, which stops at either sidewall of the spring support 182. It should be noted that the carrier support 150 is a stationary structure and the guide carrier 152 is slidable. Therefore, two drilling of pocket hole, as shown in FIG. 5, can be achieved without clamping/unclamping workpiece or entering/exiting the drill into the drill guide. In the described exemplary embodiment, the sliderability of the guide carrier 152 is possible because the workpiece is secured at its lower position between the lower clamping face 73 and the clamping face 90 as shown in FIG. 7. In other embodiments, various other snap-action mechanisms or devices may be used for this purpose.

The shuttle capability of the slidable guide carrier 152 may require only one drill guide bushing 156, which can be worn out. An insert 158 with internal threads is placed in the guide carrier 152 to accept a replaceable drill guide bushing 156 that forms a knurl head on one side, male threads in between to fit to the female thread of the insert 158, smooth portion on the other end longitudinally on its outside and a bore to receive a drill.

The elevation position of the guide carrier 98 can be predetermined by simply resting the guide carrier on one of the turret surfaces followed by tightening setscrew 108. The introduction of the height indicia 146 on either or on both guide bars 94 and 96 helps user to select proper location without the turret 110 followed by fastening setscrew 108 as shown in FIGS. 7 and 8.

An additional quick height adjustment may be achieved by a leaf spring 194 that is placed inside of a pocket in the carrier support block 150 in between and substantially perpendicular to the guide bars 94 and 96, which may called quick engagement and is shown in FIGS. 10 and 11. FIG. 10 shows the leaf spring without cover 192. Normally the downwardly bent leaf spring 194 is extended/preloaded toward the two opposing surfaces of the guide bars 94 and 96 to stay in its position since downward movement of the carrier support 150 is restricted by the turret 110 and upward movement is restricted by the friction between the ends of leaf spring and the two opposing surfaces of the guide bars, but once the leaf spring is pushed downward to a position 194' by pressure from the push button 190, the guide carrier support 150 is freed from locking because the two ends of leaf spring are separated from guide bars. Therefore the height adjustment/movement of the guide carrier 152 and the carrier support 150 may be achieved through snapping the leaf spring.

This invention has been described in its presently preferred best modes and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. An adjustable pocket drilling fixture comprising:
a base having a base face adapted to engage a workpiece;
a clamp body having a first clamping face;
a clamping structure interengaging said clamp body and said base, said clamping structure including a clamp actuator positioned adjacent to said base to move said clamp body in a clamping direction;
a guide carrier disposed on said base and having a second clamping face which is substantially perpendicular with respect to said base face; and
at least one drill guide in said guide carrier, said drill guide having an axis which slantly intersects said second clamping face, said guide carrier being movably mounted on said base to move in a substantially perpendicular direction with respect to said base face to permit drilling at a selected position of a face of the workpiece.

2. The adjustable pocket drilling fixture of claim 1, further comprising an upright structure disposed on said base to engage said guide carrier so that said guide carrier can be positioned at a predetermined distance from said base.

3. The adjustable pocket drilling fixture of claim 2, wherein said upright structure comprises at least one bar, wherein said guide carrier has at least one corresponding opening for said bar, such that said guide carrier can be moved and positioned with respect to said base.

4. The adjustable pocket drilling fixture of claim 2, further comprising means for determining the position of said guide carrier with respect to said base, said determining means comprising at least one of indicia which are indicative of workpiece thickness, or a turret, wherein said determining means is disposed on at least one of said guide carrier, said upright structure or said base.

5. An adjustable pocket drilling fixture comprising:
a base having a base face adapted to engage a workpiece;
a clamp body having a first clamping face;
a clamping structure interengaging said clamp body and said base, said clamping structure including a clamp actuator to move said clamp body;
a guide carrier disposed on said base and having a second clamping face which is substantially perpendicular to said base face, and
at least one drill guide disposed in said guide carrier, said drill guide having an axis which is adapted to slantly intersect two adjoining surfaces of the workpiece, wherein said clamp actuator is positioned at an opposite side from said clamp body with respect to said second clamping face and adjacent to said base so that clamping and drilling the workpiece can be accomplished on the same side.

6. The adjustable pocket drilling fixture of claim 1, wherein said clamp actuator is positioned at an opposite side from said clamp body and adjacent to said base so that clamping and drilling the workpiece can be accomplished on the same side.

7. An adjustable pocket drilling fixture comprising:
a clamping face, said clamping face defining a plane;
a guide carrier, at least one drill guide in said guide carrier, said drill guide having an axis which intersects said plane of said clamping face; and
indicia formed on a surface in-between said plane and an entrance of said drill guide, which has a relationship to said axis, wherein width of said indicia is substantially equal to an internal diameter of said drill guide.

8. An adjustable pocket drilling fixture comprising:
a clamping face, said clamping face defining a plane;
a guide carrier, at least one drill guide in said guide carrier to guide a step drill, said drill guide having an axis which angularly intersects said plane of said clamping face; and,
indicia disposed on a shank surface of said step drill, wherein said indicia are indicative of workpiece thickness.

9. The adjustable pocket drilling fixture of claim 1, further comprising a third clamping face formed in said base, which is substantially parallel to said second clamping face so as to reduce bending stress on at least one of said clamping structure, said clamp body or said guide carrier.

10. The adjustable pocket drilling fixture of claim 2, wherein said guide carrier is slidably mounted on said upright structure in a direction substantially normal to said clamping direction and to said perpendicular direction.

11. The adjustable pocket drilling fixture of claim 2, further comprising a quick engagement used to slidably couple said guide carrier and said upright structure, wherein said quick engagement can be disengaged to slide said guide carrier with respect to said upright structure, and engaged to fix a position of said guide carrier with respect to said upright structure.

12. The adjustable pocket drilling fixture of claim 10, further comprising a linear ratchet mechanism which engages said guide carrier and said upright structure, wherein said linear ratchet mechanism can be unlocked to slide said guide carrier with respect to said upright structure, and locked to fix a position of said guide carrier with respect to said upright structure.

* * * * *